United States Patent
Soni et al.

(10) Patent No.: US 12,505,245 B2
(45) Date of Patent: Dec. 23, 2025

(54) SYSTEM AND METHOD FOR ROLE BASED ACCESS CONTROL FOR DATA

(71) Applicant: Microsoft Technology Licensing, LLC, Redmond, WA (US)

(72) Inventors: Saurabh Soni, Telangana (IN); Prachi Jain, Telangana (IN); Amith Pallankize, Telangana (IN); Nishant Sethi, Karnataka (IN); Vidhi Raheja, Telangana (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 292 days.

(21) Appl. No.: 18/058,596

(22) Filed: Nov. 23, 2022

(65) Prior Publication Data
US 2024/0169085 A1 May 23, 2024

(51) Int. Cl.
*G06F 21/62* (2013.01)
*G06F 21/60* (2013.01)

(52) U.S. Cl.
CPC ........ *G06F 21/6227* (2013.01); *G06F 21/604* (2013.01); *G06F 2221/2141* (2013.01)

(58) Field of Classification Search
CPC ............... G06F 21/6227; G06F 21/604; G06F 2221/2141
See application file for complete search history.

(56) References Cited

U.S. PATENT DOCUMENTS

| 2002/0095405 | A1  | 7/2002  | Fujiwara |
| 2012/0102489 | A1* | 4/2012  | Staiman ............. G06Q 10/0631 718/1 |
| 2013/0117313 | A1  | 5/2013  | Miao et al. |
| 2019/0362087 | A1* | 11/2019 | Ferrans ................. H04L 63/102 |

OTHER PUBLICATIONS

International Search Report and Written Opinion received for PCT Application No. PCT/US2023/036631, mailed on Feb. 12, 2024, 11 pages.
"Variations on a Theme: Dynamic RLS Patterns", Retrieved from: https://www.elegantbi.com/post/dynamicrlspatterns, Mar. 9, 2020, 9 Pages.
International preliminary report on patentability Received for PCT Application No. PCT/US23/036631, mailed on Jun. 5, 2025, 06 Pages.

* cited by examiner

*Primary Examiner* — Ayoub Alata
(74) *Attorney, Agent, or Firm* — ArentFox Schiff LLP

(57) ABSTRACT

Example aspects include techniques for role based access control for data. These techniques may include assigning a data tag to an attribute of a plurality of database rows of a database table, the data tag identifying a pre-defined category associated with the attribute and generating an association between the data tag and a data usage scenario, the association indicating that the attribute is accessible to a plurality of requests associated with the data usage scenario. In addition, the techniques may include associating a user role to the data usage scenario, and determining, in response to a request, a permission of an account based on the data usage scenario and the user role associated with the request. Further, the techniques may include providing the attribute for a database row of the plurality of database rows based on the permission.

20 Claims, 6 Drawing Sheets

200 ⟶

Plurality of Columns 206(1)-(n) ⟶

☒ Deny
☒ Permit

| Rolegroups | Col1 | Col2 | Col3 | Col4 | Col5 |
|---|---|---|---|---|---|
| Role Grp1 | Permit | Permit | Permit | Permit | Permit |
| Role Grp2 | Deny | Deny | Deny | Deny | Deny |
| Role Grp3 | Permit | Permit | Permit | Permit | Permit |
| Role Grp4 | Deny | Deny | Deny | Deny | Deny |
| Role Grp5 | Permit | Permit | Permit | Permit | Permit |

Role Groups 204(1)-(n)

Security Access Permissions 202(1)-(n)

Plurality of Data Tags 216(1)-(n)

Plurality of Columns 214(1)-(n)

| | Tag 1 | Tag 2 | Tag 3 | Tag 4 | Tag 5 |
|---|---|---|---|---|---|
| Rolegroups | Col1 | Col2 | Col3 | Col4 | Col5 |
| Role Grp1 | Permit | Permit | Deny | Permit | Permit |
| Role Grp2 | Permit | Permit | Permit | Permit | Permit |
| Role Grp3 | Permit | Deny | Deny | Permit | Permit |
| Role Grp4 | Deny | Deny | Deny | Deny | Deny |
| Role Grp5 | Permit | Deny | Permit | Deny | Permit |

Role Groups 212(1)-(n)

Security Access Permissions 210(1)-(n)

FIG. 2B

SYSTEM AND METHOD FOR ROLE BASED ACCESS CONTROL FOR DATA

BACKGROUND

Most applications incorporate a data layer for storing information and providing the information to users and/or services. For example, many applications include database management systems for data persistence. Access to database management systems has traditionally been achieved by assigning one or more access privileges to one or more users of the protected system. As an example, many systems employ role based access control (RBAC) techniques that enable a user to access protected system resources based on a role assigned to the user. In particular, the user is permitted to access and/or perform operations on the protected system based on one or more access privileges assigned to the role. However, RBAC is limited to row level access security. Additionally, RBAC does not provide dynamic updates and requires system administrators to manually update RBAC configuration information, which can be cumbersome and prone to error and/or oversight.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In some aspects, the techniques described herein relate to a method including: assigning a data tag to an attribute of a plurality of database rows of a database table, the data tag identifying a pre-defined category associated with the attribute; generating an association between the data tag and a data usage scenario, the association indicating that the attribute is accessible to a plurality of requests associated with the data usage scenario based on the assigning of the data tag to the attribute; associating a user role to the data usage scenario, the user role representing a job function performed by a plurality of user accounts possessing the user role; determining, in response to a request, a permission of an account based on the data usage scenario and the user role associated with the request; and providing the attribute for a database row of the plurality of database rows based on the permission.

In some aspects, the techniques described herein relate to a system including: a memory storing instructions thereon; and at least one processor coupled with the memory and configured by the instructions to: assign a data tag to an attribute of a plurality of database rows of a database table, the data tag identifying a pre-defined category associated with the attribute; generate an association between the data tag and a data usage scenario, the association indicating that the attribute is accessible to a plurality of requests associated with the data usage scenario based on the assigning of the data tag to the attribute; associate a user role to the data usage scenario, the user role representing a job function performed by a plurality of user accounts possessing the user role; determine, in response to a request, a permission of an account based on the data usage scenario and the user role associated with the request; and provide the attribute for a database row of the plurality of database rows based on the permission.

In some aspects, the techniques described herein relate to a non-transitory computer-readable device having instructions thereon that, when executed by at least one computing device, cause the at least one computing device to perform operations including: assigning a data tag to an attribute of a plurality of database rows of a database table, the data tag identifying a pre-defined category associated with the attribute; generating an association between the data tag and a data usage scenario, the association indicating that the attribute is accessible to a plurality of requests associated with the data usage scenario based on the assigning of the data tag to the attribute; associating a user role to the data usage scenario, the user role representing a job function performed by a plurality of user accounts possessing the user role; determining, in response to a request, a permission of an account based on the data usage scenario and the user role associated with the request; and providing the attribute for a database row of the plurality of database rows based on the permission.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 2A is a diagram illustrating an example tabular representation of row level security access permissions.

FIG. 2B is a diagram illustrating an example tabular representation of row level and column level security access permissions, in accordance with some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for implementing role-based access control for data. RBAC techniques enable a user to access protected system resources based on a role assigned to the user. As such, the user is permitted to access and/or perform operations on the protected system resources based on one or more access privileges assigned to the role. Within an organization, roles are created for various job functions, such as manager or administrator. The permissions to perform certain operations are assigned to specific roles. Organizational members are assigned particular roles, and through those role assignments, those user(s) acquire the permissions to perform particular system functions. Further, the principle of least privilege states that a user should be given only those privileges needed for the user to complete a user task. As such, if a user does not need an access right, the user should not have that right. However, conventional RBAC implementations are limited to row level access security even though a user may not require access to each attribute of the row to perform their tasks.

Aspects of the present disclosure grant safe, secure, and minimal access to organization data via row level and column level security access. In particular, based on a role of a user, a computing system maps the user to one or more data usage scenarios and column(s) accessible by the data usage scenarios as defined by a data policy. Further, the computing system stores row level and column level security access permissions within a database, and dynamically updates the row level and column level security access permissions in response to changes within the computing system. Accordingly, the present techniques inherently provide least privilege access at a column level granularity, while reducing access leakage due to outdated access control information.

Illustrative Environment

Figure 1:
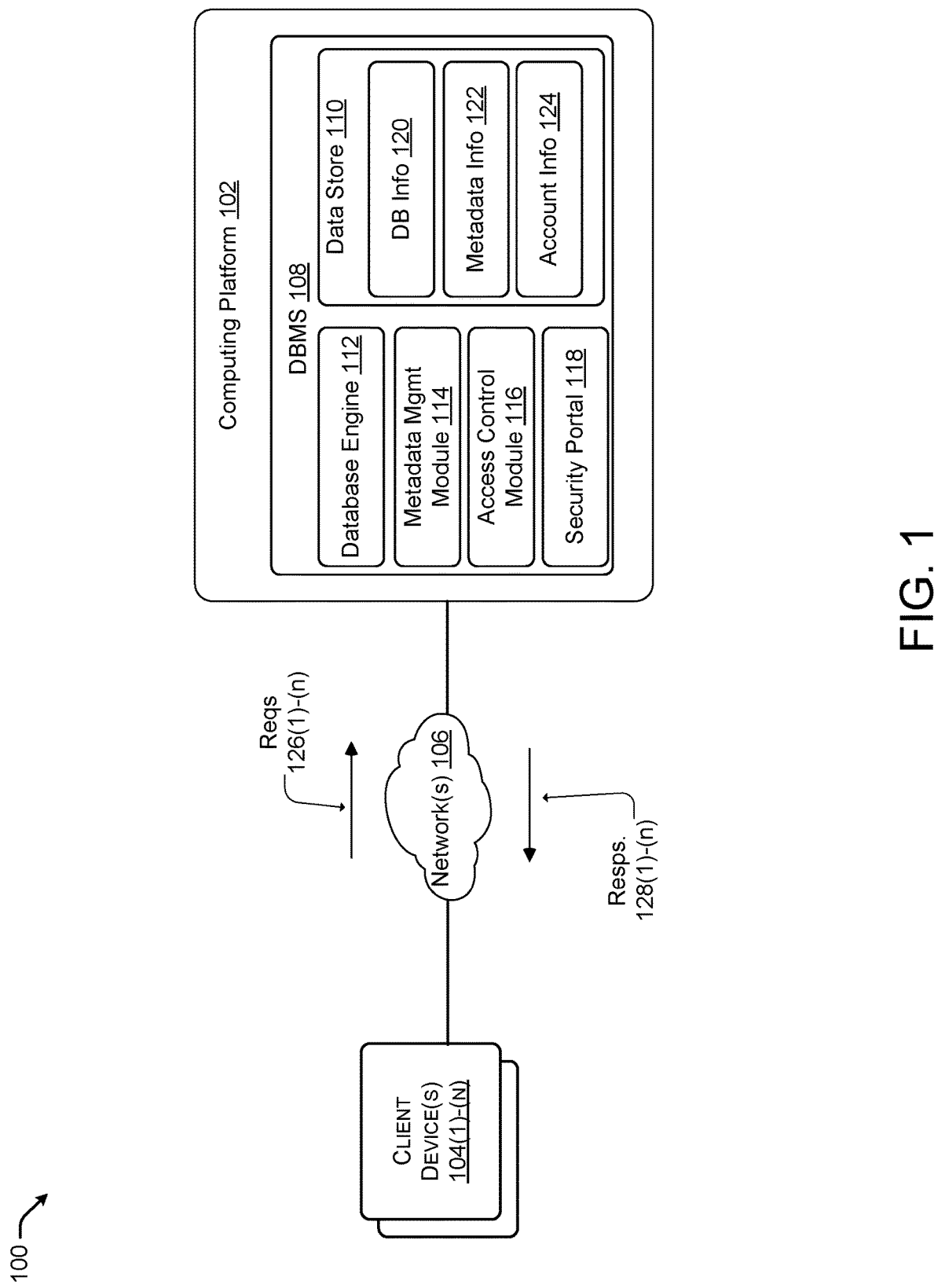
FIG. 1 illustrates an example architecture of a network management system, in accordance with some aspects of the present disclosure.

FIG. 1 is a diagram showing an example architecture of a database management system, in accordance with some aspects of the present disclosure. As illustrated in FIG. 1, the computing system 100 includes a computing platform 102, a plurality of client devices 104(1)-(*n*), and one or more networks 106(1)-(*n*). Some examples of the client devices 104(1)-(*n*) include computing devices, smartphone devices, Internet of Things (IoT) devices, drones, robots, process automation equipment, sensors, control devices, vehicles, transportation equipment, tactile interaction equipment, virtual and augmented reality (VR and AR) devices, industrial machines, virtual machines, etc. The network(s) 106 may comprise any one or combination of multiple different types of networks, such as cellular networks, wireless networks, local area networks (LANs), wide area networks (WANs), personal area networks (PANs), the Internet, or any other type of network configured to communicate information between computing devices (e.g., the computing platform 102, and the client devices 104(1)-(N)).

Further, the computing platform 102 includes a database management system (DBMS) 108. In some aspects, the DBMS 108 is configured to organize a collection of data on a datastore 110. Additionally, in some aspects, the DBMS 108 and the datastore 110 reside on a single storage device or system or on multiple storage devices or systems such as available at one or more data centers. Further, the DBMS 108 includes one or more database services (e.g., relational, non-relational, structured query language (SQL), noSQL) for storing, querying, and updating data.

In addition, the datastore 110 includes database objects. In some aspects, a database object includes a database table that organizes data in columns and rows. Each row represents a unique record, and each column represents a field within the record. For example, a table of contact addresses may include a row for each person and attributes (i.e., columns) for first name, last name, street address, city, state, and/or zip code.

In some aspects, the computing platform 102 is a multi-tenant environment that provides the client devices 104(1)-(*n*) with distributed storage and access to software, services, files, and/or data via one or more network(s) 106. In a multi-tenancy environment, one or more system resources of the computing platform 102 are shared among tenants but individual data associated with each tenant is logically separated. Some examples of a system resource include computing units, bandwidth, data storage, application gateways, software load balancers, memory, field programmable gate arrays (FPGAs), graphics processing units (GPUs), input-output (I/O) throughput, or data/instruction cache. For example, the computing platform 102 may be a cloud computing device, and the DBMS may be a platform as a service (PaaS) or database as a service (DaaS). Further, in some aspects, a client device 104 includes one or more applications configured to interface with the computing platform 102 and/or one or more cloud applications deployed on the computing platform 102. The client devices 104(1)-(*n*) may be associated with customers (i.e., tenants) of the operator of the computing platform 102 or end-users that are subscribers to services and/or applications of the customers that are hosted on the computing platform 102 and provided by the customers to the end users via the computing platform 102.

As illustrated in the FIG. 1, the DBMS 108 includes a database engine 112, a metadata management module 114, an access control module 116, a security portal 118, database information 120, metadata information 122(1)-(*n*), and account information 124(1)-(*n*). In some aspects, the database engine 112 is configured to perform data retrieval and data manipulation. In particular, the database engine 112 may receive requests 126(1)-(*n*) for data stored within the datastore 110. Further, in some aspects, the database engine 112 generates database responses 128(1)-(*n*) including data stored within the datastore 110 in response to the database requests 126(1)-(*n*).

In some aspects, the metadata management module 114 manages the metadata information 122. Further, in some aspects, the DBMS 108 is a metadata driven system. For example, the metadata management module 114 may create, edit, and remove metadata that defines permissions for accessing resources (e.g., the datastore 110) within the metadata information 122 via the DBMS 108. As described herein, in some aspects, the metadata management module 114 detects updates within the DBMS 108 and updates the metadata information 122 in view of the updates performed within the DBMS 108. Further, in some aspects, each tenant and/or tenant project may have metadata specific to the tenant and/or tenant project.

As described in detail herein, the DBMS 108 implements RBAC for data with column-level access security in order to enforce the principle of least privileged access (i.e., grant only the amount of access to a user required to perform their jobs). As such, the metadata information 122 includes account information 124(1)-(*n*) indicating the user roles, organizational title, and/or demographic information for each account. Some examples of a user role include contributor, reader, owner. Some other examples of a user role include technical account manager, customer account manager, account executive, engineer, non-services user, business program manager, specialist, external contractor, management, cloud solution architect, and cloud solution architect manager. Further, in some aspects, the metadata information 122 includes data tags, data usage scenarios, security groups, and/or account permissions.

Each attribute within the datastore 110 may be assigned a data tag identifying a predefined category associated with the attribute. Some examples of a predefined category include support content data, support interaction data, professional services content data, professional service interaction and consulting data, contact data, account data, organization business data, feedback and ratings data, employee data, and customer contact information. In some aspects, each data tag may correspond to a category defined by a compliance standard and/or a handling standard, e.g., General Data Protection Regulation (GDPR), Lei Geral de Proteção de Dados (LGPD). As such, as described herein, access to the data of datastore 110 can be governed in accordance with a compliance standard, and/or a handling standard. Further, an administrator may add custom data tags for assignment to the attributes of the datastore 110.

In some aspects, a data usage scenario may refer to an approved use case for utilization of data that has been tagged by a data tag. In some aspects, a data usage scenario corresponds to a workflow and/or one or more related tasks. Some examples of data usage scenario include upselling and/or cross-selling, fraud prevention, cyberattack and cybercrime prevention, internal reporting, billing and account management, compensation, testing/training/research, and internal data sharing. Further, in some aspects, a data usage scenario is associated with a user role and a data tag. In some aspects, a security group may refer to a plurality of user accounts having a common user role. In some aspects, adding a user account to a security group may dynamically assign the user a particular user role corresponding to the security group. In some other aspects, assigning a user role to an account via membership in the security group, implicitly creates a permission mapping between an account and an attribute via the associated data usage scenario and user role.

Further, in some aspects, the metadata management module 114 dynamically updates the metadata information 122. In particular, the metadata management module 114 dynamically updates the metadata information 122 in response to modifications to the account information 124, additions and/or modifications to the datastore 110, and/or modifications to rules/requirements associated with the data of the datastore 110. For example, in some aspects, the metadata management module 114 detects that an account has been added to the account information 124 and updates the metadata information 122 to reflect the addition of the account. For instance, the metadata management module 114 generates access permissions for the account based on a user role associated with account and data usage scenarios expected to be associated with the account. In some aspects, the metadata management module 114 detects that user details within the metadata information 122 have been modified and updates the metadata information 122 to reflect changes to the user details of the account. For example, the metadata management module 114 may detect that an account's title within an organization has changed and update the user role of the account based on the new title. Further, the metadata management module 114 may update the security group of the account in response to the new user role as the account may have different permissions due to the new title.

As another example, in some aspects, the metadata management module 114 detects that a data table has been added to the datastore 110 or an attribute has been added to a data table of the datastore 110, and dynamically generate metadata information 122 providing or denying access to the new data table or the new attribute for accounts within the account information 124. Further, in some aspects, the metadata management module 114 determines whether to generate permissions to provide or deny access by an account to the newly-added resource within the metadata information 122 based at least in part on the data tag associated with the newly-added resource, a user role of the account, and/or one or more data usage scenarios associated with the account. As yet still another example, in some aspects, the metadata management module 114 detects that a security rule and/or a security requirement (e.g., a data tag assignment or a data usage scenario assignment) of the DBMS 108 has changed, and update the metadata information 122 in response to the detected change. In some aspects, the metadata management module 114 is configured to periodically determine whether any changes have occurred that require updates to the metadata information 122. For example, the metadata management module 114 may be configured to periodically analyze a system log to determine whether any recent activity within the DBMS 108 should be accompanied by an update. Additionally, or alternatively, in some other aspects, the metadata management module 114 may receive a request to detect changes and update the metadata information 122 based on the detected changes. Accordingly, the metadata management module 114 may be configured to prevent access leakage resulting from stale permissions and security oversights. Further, in some aspects, the metadata management module 114 requests approval by an administrator prior to updating the metadata information 122 in response to a detected change.

The access control module 116 may dynamically evaluate whether requests for the resources of the DBMS 108 should be granted or denied based on the metadata information 122. For example, the database engine 112 may receive a request 126(1) for information from the datastore 110 from a client device 104(1). Further, the access control module 116 may determine the permissions of an account associated with the request 126(1) and determine the objects within the datastore 110 that are accessible based on the permissions. If the permissions indicate that the account is permitted to data access objects within the datastore 110, the access control module 116 causes the database engine 112 to generate a response 128(1) to the request 126(1) including the objects accessible to the account, and transmits the response 128(1) to the client device 104(1). In some aspects, the permissions indicate that supervisory approval is required in order to provide access. Accordingly, when the permissions indicate that approval is required, the access control module 116 transmits an approval request to an administrator and/or owner of the requested resource. Upon approval of the approval request, the access control module 116 causes the database engine 112 to generate a response 128 including the objects accessible to the account and transmits the response to the associated client device 104.

In some aspects, the database engine 112 receives requests 126(1)-(*n*) directly from the client devices 104(1)-(*n*) in an implicit access provisioning workflow. In some aspects, the requests 126(1)-(*n*) are automatically generated by applications at the client devices 104. For example, an application may be configured to submit application programming interface (API) requests to the DBMS 108 or an application associated with the DBMS 108. Further, in the implicit provisioning workflow, the requests 126(1)-(n) include at least one of an account identifier of the account, a data usage scenario identifier, a role identifier, and/or a security role identifier. In addition, the access control module 116 employs the at least one of an account identifier of the account, a data usage scenario identifier, a role identifier, and/or a security role identifier of a request 126 to determine the relevant permissions for the requests 126(1)-(n).

Additionally, in an explicit access provisioning workflow, a client device 104 employs the security portal 118 to submit requests 126(1)-(n) to the database engine 112. In some examples, a user may utilize the explicit access provisioning workflow when the account of the user is not associated with a user role known to the DBMS 108. Further, in some aspects, the security portal 118 is a web application that receives, from the user, at least a program identifier identifying a program associated with the resource of interest to the user and a data usage scenario identifier identifying the purpose of the request for the resource. Further, in some aspects, the user further provides a rationale supporting the request and agrees to a terms of service agreement setting forth acceptable usage of the requested resource. Upon receipt of the information from the user via the security portal 118, the security portal 118 generates a request 126(1)-(n) including the data usage scenario identifier and an identifier of the requested resource. In some aspects, the security portal 118 presents a plurality of input controls for providing information to generate the requests 126(1)-(n). Further, the security portal 118 transmits the requests 126(1)-(n) to the database engine 112. As described in detail herein, the database engine 112 employs the access control module 116 to determine whether a request should be granted or partially granted based on the permissions of the corresponding account within the metadata information 122.

Additionally, in order to temporally enforce least privilege, in some aspects, the access control module 116 performs automated renewal for accounts having implicit access enabled at a configurable frequency and provides an interface for an account utilizing explicit access to request for renewal of the existing access privileges of the account. For example, the access control module 116 may perform a background job on a predefined schedule that checks the expiration date of every account utilizing the implicit access provisioning workflow and automatically extends the access privileges of accounts that have not had their role modified, while canceling or modifying the access privileges of accounts that have had their role modified. As another example, in some aspects, the security portal 118 may include a renewal control for accounts whose access is set to expire in 30 days or less from the current date. Additionally, when an account selects the renewal control, the security portal 118 and/or access control module 116 transmits a request for renewal confirmation from an owner of the resources associated with the access privileged being renewed.

FIG. 2A is a diagram illustrating an example tabular representation 200 of row level security access permissions 202. As illustrated in FIG. 2A, a plurality of role groups 204(1)-(n) may have access to a plurality of columns 206(1)-(n) via the static row level security access permissions 202(1)-(n). In a row level security implementation, access control cannot be provided at a column level. For example, as illustrated, in FIG. 2A, if a role group 204(1) is provided access to a column 206(1) of a row, the role group 204(1) must be provided access to all the other columns 206(2)-(n) of the row. Conversely, if a role group 204(2) is not provided access to a column 206(1) of a row, the role group 204(2) cannot be provided access to all other columns 206(2)-(n) of the row.

FIG. 2B is a diagram illustrating an example tabular representation 208 of row level and column level security access permissions 210, in accordance with some aspects of the present disclosure. As illustrated in FIG. 2B, a plurality of role groups 212(1)-(n) may have access to a plurality of columns 214(1)-(n) via the row level and column level security access permissions 210. In a row level and column level security system, access control is provided at a column level via the plurality of data tags 216(1)-(n), as described in detail herein. For example, as illustrated, in FIG. 2B, the role group 204(1) is provided access to a column 214(1) of a row and not provided access columns 214(3) of the row via the relationship between individual data tags 216 and the plurality of role groups 212(1)-(n). Further, as described in detail herein, the row level and column level security access permissions 210 are dynamically updated in response to modifications to the account information (e.g., account information 124), additions and/or modifications to the plurality of columns 214(1)-(n) (e.g., the datastore 110), and/or modifications to rules/requirements associated with the plurality of data tags 216(1)-(n) and/or the plurality of columns 214(1)-(n).

Figure 3:
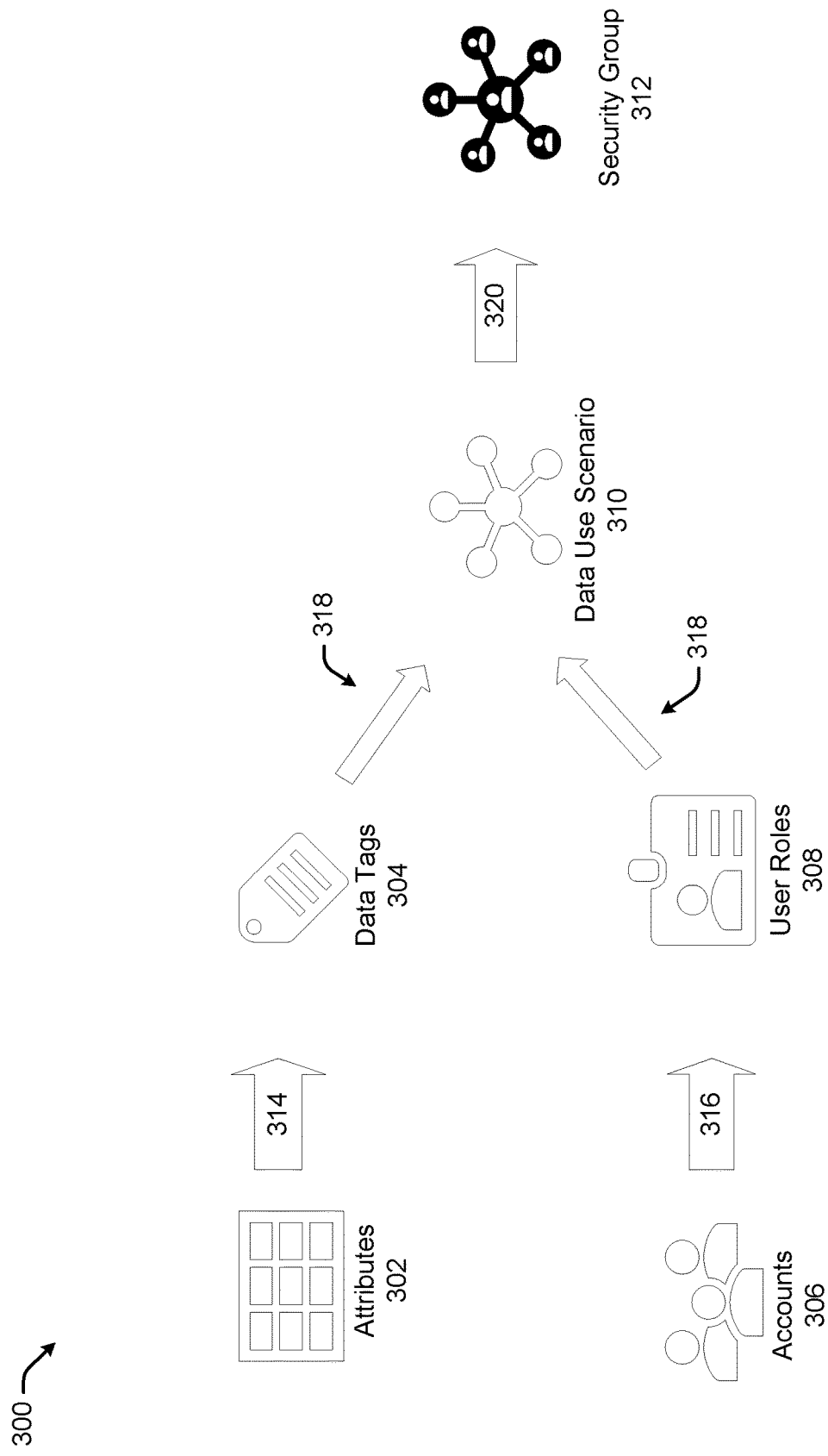
FIG. 3 is a diagram illustrating metadata information in a row level and column level security system, in accordance with some aspects of the present disclosure.

FIG. 3 is a diagram illustrating metadata information 300 in a row level and column level security system, in accordance with some aspects of the present disclosure. As described herein, the metadata information includes attributes 302, data tags 304, accounts 306, user roles 308, a data usage scenario 310, and a security group 312. As illustrated in FIG. 3, at step 314, a data tag 304 is assigned to an attribute 302. At step 316, a user role 308 is assigned to an account 306. In some aspects, the user role is associated with an organization title of the user of the account. Further, at step 318, a data usage scenario is associated with the data tag 304 and the account 306 based on the user role 308. Further, at step 320, the accounts 306 associated with the data usage scenario 310 are placed into the security group 312, thereby creating a permission mapping between an account and an attribute via the data usage scenario and the user role. In some aspects, each tenant and/or tenant project has its own metadata information 300 for the resources of the tenant and/or tenant project.

Figure 4:
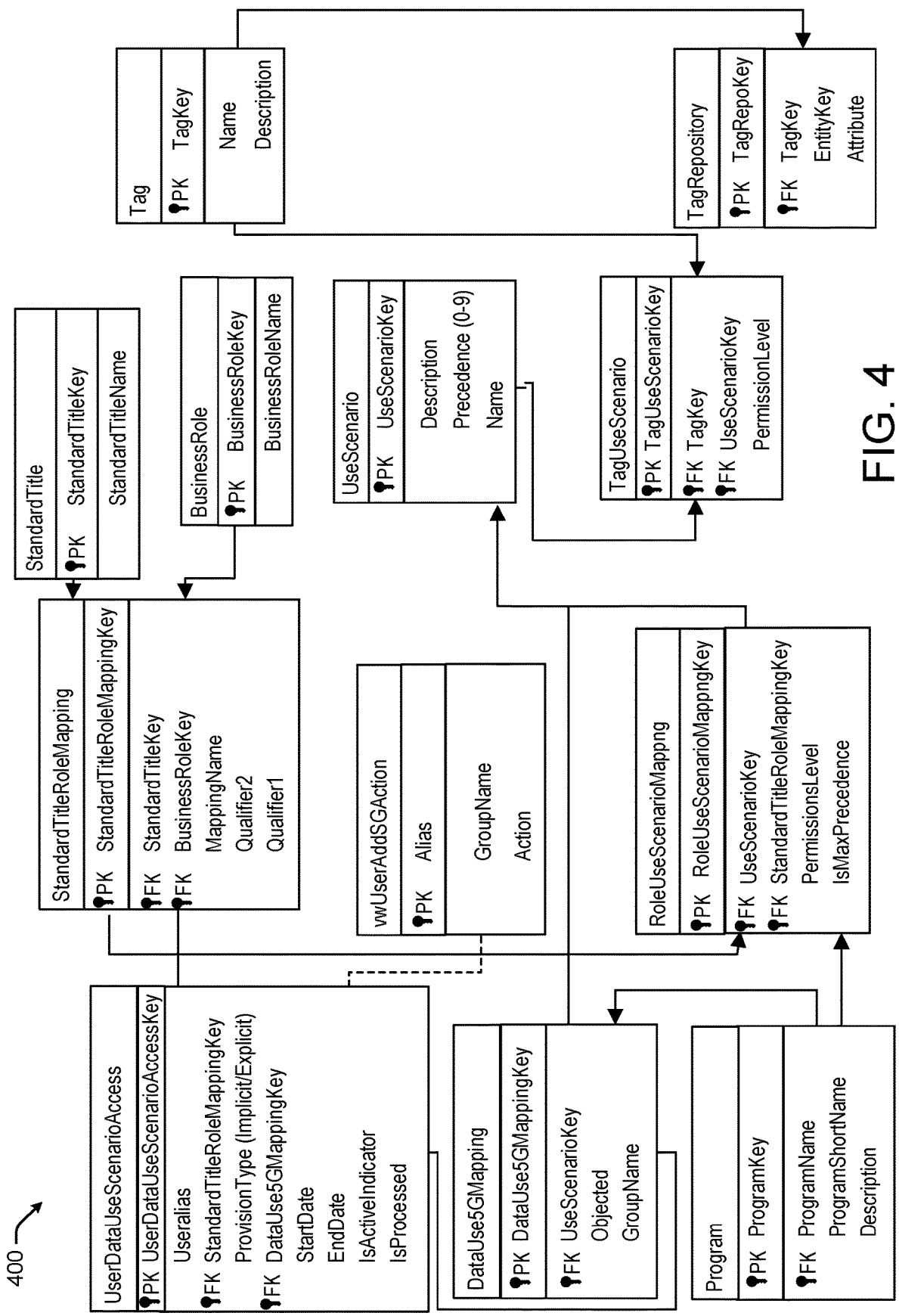
FIG. 4 is a diagram illustrating an example data model of metadata information for implementing row level and column level security, in accordance with some aspects of the present disclosure.

FIG. 4 is a diagram illustrating an example data model 400 of metadata for implementing row level and column level security, in accordance with some aspects of the present disclosure. As illustrated in FIG. 4, the data model 400 may include a tag entity that includes the available data tags, a tag repository entity that includes column level information and the associated data tag, a tag use scenario entity that includes rules that define mapping between data tags and data usage scenarios, a data usage scenario entity that includes the available data usage scenarios, a user role entity that includes the available user roles for which access will be provisioned, a standard title entity that includes the available standard organizational titles for which access will be provisioned, a standard title to role mapping entity that includes standard titles to user role mapping information for which access will be provisioned, a user security group action view/stored procedure to provide actions to be performed on the security groups, a user role to data usage scenario mapping entity that includes information mapping data usage scenarios to associated business role, a data usage security group mapping entity that includes the name of security groups corresponding to data usage scenarios, a user to data usage scenario access entity that includes all the users that will be provisioned access, and a program entity that maps a track, a program, an application, and/or a suite of programs to RBAC rules defined using the RBAC data model disclosed herein. In some aspects, the program entity model permits individual programs to different business rules. In some aspects, each tenant and/or tenant project has its own data model 400 for the resources of the tenant and/or tenant project. Further, in some aspects, a metadata management module (e.g., the metadata management module 114) updates at least one of the tag entity, the tag repository entity, the tag use scenario entity, the data usage scenario entity, the standard title entity, or the user role entity in response to a change detected by the metadata management module 114.

Example Processes

Figure 5:
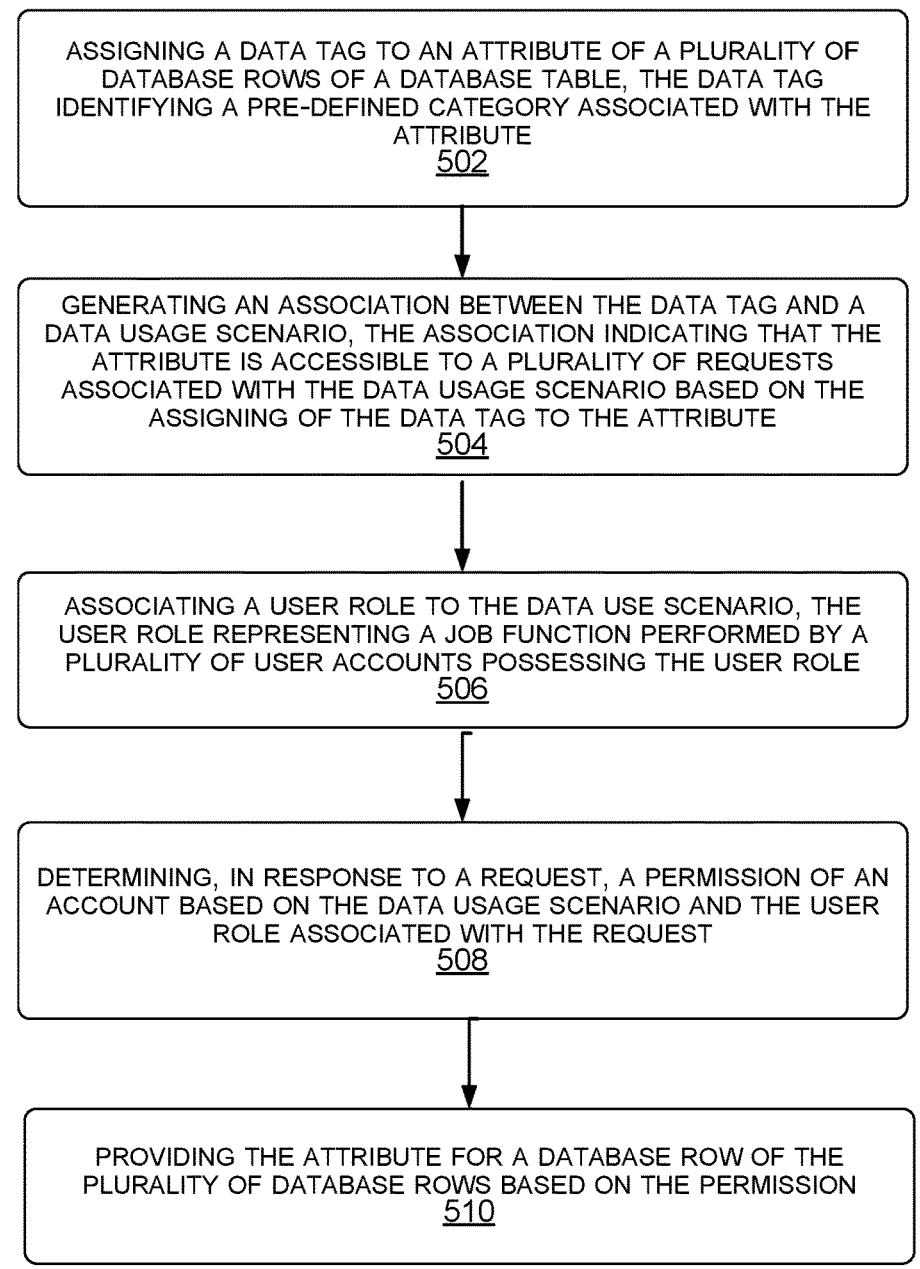
FIG. 5 is a flow diagram illustrating an example method for implementing role based access control for data, in accordance with some aspects of the present disclosure.

FIG. 5 is a flow diagram illustrating an example method 500 for implementing vendor-agnostic state and configuration collection from network devices, in accordance with some aspects of the present disclosure. The method 500 is performed by one or more components of the DBMS 108, the computing device 600, or any device/component described herein according to the techniques described with reference to the previous figures.

At block 502, the method 500 includes assigning a data tag to an attribute of a plurality of database rows of a database table, the data tag identifying a pre-defined category associated with the attribute. For example, the metadata management module 114 applies a data tag to an attribute of the datastore 110. Some examples of a data tag include tags identifying one of support content data, support interaction data, professional services content data, professional service interaction and consulting data, contact data, account data, organization business data, feedback and ratings data, employee data, and customer contact information.

Accordingly, the DBMS 108, the computing device 600, and/or the processor 602 executing the metadata management module 114 provides means for assigning a data tag to an attribute of a plurality of database rows of a database table, the data tag identifying a pre-defined category associated with the attribute.

At block 504, the method 500 includes generating an association between the data tag and a data usage scenario, the association indicating that the attribute is accessible to a plurality of requests associated with the data usage scenario based on the assigning of the data tag to the attribute. For example, the metadata management module 114 associates the data tag and a data usage scenario with each other by indicating that attributes having the data tag are accessible within the context of the data usage scenario.

Accordingly, the DBMS 108, the computing device 600, and/or the processor 602 executing the metadata management module 114 provides means for generating an association between the data tag and a data usage scenario, the association indicating that the attribute is accessible to a plurality of requests associated with the data usage scenario based on the assigning of the data tag to the attribute.

At block 506, the method 500 includes associating a user role to the data usage scenario, the user role representing a job function performed by a plurality of user accounts possessing the user role. For example, the metadata management module 114 associates a user role with a data usage scenario. As a result, in some aspects, an account having the user role is able to access data having the data tag in the context of the data usage scenario. As described in detail herein, in some aspects, an account having the user role is given membership within a security group, and the security group is able to access the attribute as a result of the data usage scenario and data tag pair associated with the user role.

Accordingly, the DBMS 108, the computing device 600, and/or the processor 602 executing the metadata management module 114 provides means for associating a user role to the data usage scenario, the user role representing a job function performed by a plurality of user accounts possessing the user role.

At block 508, the method 500 includes determining, in response to a request, a permission of an account based on the data usage scenario and the user role associated with the request. For example, if the DBMS 108 receives a request 126 for the attribute from the datastore 110, the access control module 116 determines the security group of an account associated with the request 126 and whether the security group has access rights for the attribute.

Accordingly, the DBMS 108, the computing device 600, and/or the processor 602 executing the access control module 116 provides means for determining, in response to a request, a permission of an account based on the data usage scenario and the user role associated with the request.

At block 510, the method 500 includes providing the attribute for a database row of the plurality of database rows based on the permission. For example, the database engine 112 generates a response 128 to the request 126 including the attribute when the account has access to the attribute based upon membership in the security group.

Accordingly, the DBMS 108, the computing device 600, and/or the processor 602 executing the database engine 112 provide means for providing the attribute for a database row of the plurality of database rows based on the permission.

In some aspects, the techniques described herein relate to a method, further including: receiving, via a web application, a data usage scenario selection and a data identifier corresponding to the attribute; and generating the request based on the data usage scenario selection and the data identifier.

In some aspects, the techniques described herein relate to a method, further including receiving the request from a client device, the request including at least an account identifier identifying the account and a data identifier corresponding to the attribute.

In some aspects, the techniques described herein relate to a method, wherein the permission corresponds to membership within a security group, and wherein determining the permission of the account further includes determining that the account is a member of the security group.

In some aspects, the techniques described herein relate to a method, further including adding the account to the security group based upon the account possessing the user role.

In some aspects, the techniques described herein relate to a method, wherein the permission is stored as metadata within a database, and further including: detecting an update to the attribute, the database table, the plurality of user accounts, the data usage scenario, and/or the user role; and dynamically updating the metadata based upon the detecting.

In some aspects, the techniques described herein relate to a method, wherein the permission is a first permission, the attribute is a first attribute, and further including: determining, in response to the request, absence of a second permission based on a security group of the account; and denying access to a second attribute of the database row of the plurality of database rows based on the absence of the second permission.

While the operations are described as being implemented by one or more computing devices, in other examples various systems of computing devices may be employed. For instance, a system of multiple devices may be used to perform any of the operations noted above in conjunction with each other.

Illustrative Computing Device

Figure 6:
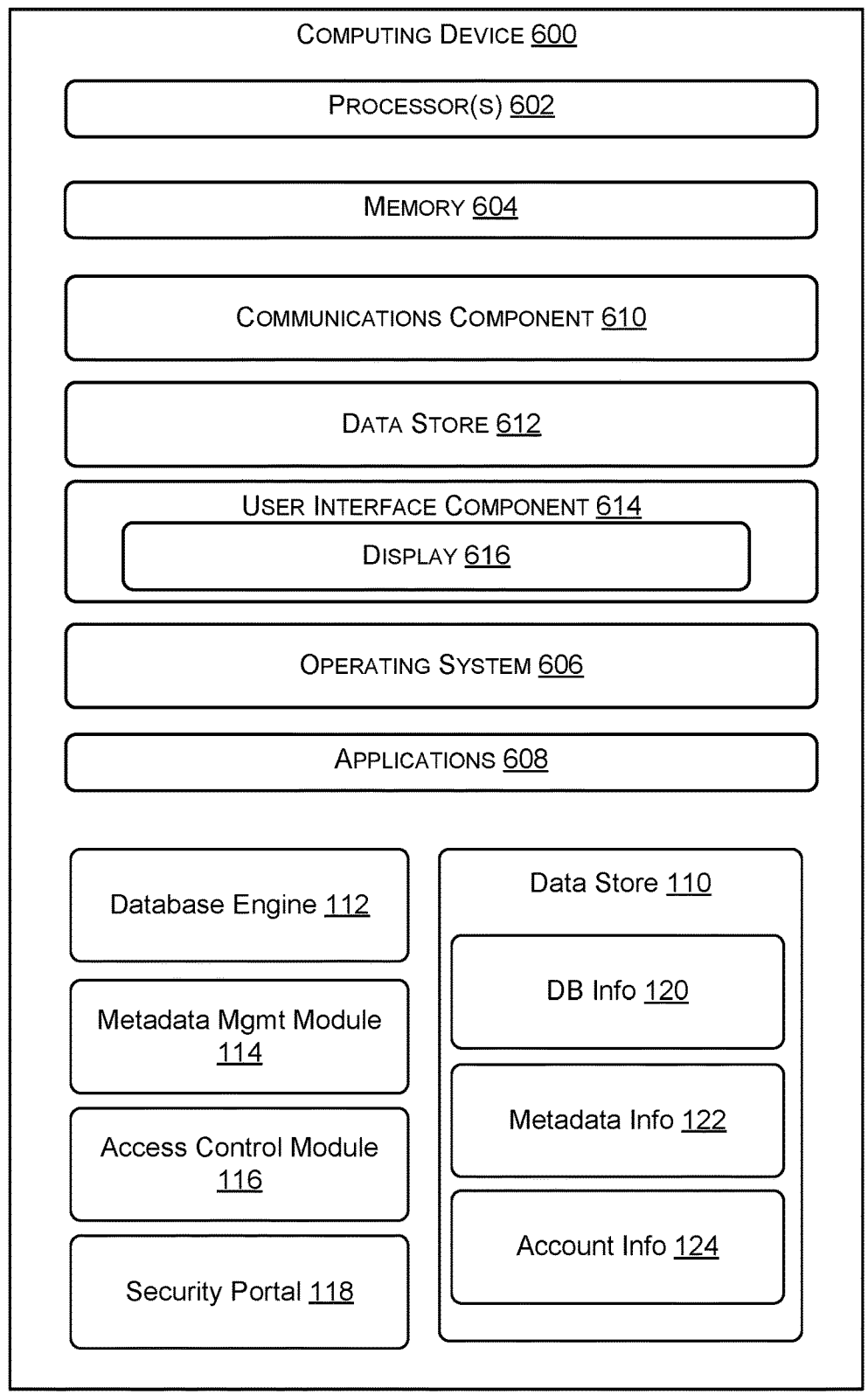
FIG. 6 is a block diagram illustrating an example of a hardware implementation for a computing device(s), in accordance with some aspects of the present disclosure.

Referring now to FIG. 6, an example of a computing device(s) 600 (e.g., the DBMS 108). In one example, the computing device(s) 600 includes the processor 602 for carrying out processing functions associated with one or more of components and functions described herein. The processor 602 can include a single or multiple set of processors or multi-core processors. Moreover, the processor 602 may be implemented as an integrated processing system and/or a distributed processing system. In an example, the processor 602 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 602 may include other processing components such as one or more arithmetic logic units (ALUs), registers, or control units.

In an example, the computing device 600 also includes memory 604 for storing instructions executable by the processor 602 for carrying out the functions described herein. The memory 604 may be configured for storing data and/or computer-executable instructions defining and/or associated with the database engine 112, the metadata management module 114, the access control module 116, the security portal 118, the database information 120, the metadata information 122(1)-(n), and the account information 124, and the processor 602 may execute the database engine 112, the metadata management module 114, the access control module 116, and the security portal 118. An example of memory 604 may include, but is not limited to, a type of memory usable by a computer, such as random access memory (RAM), optical discs, volatile memory, non-volatile memory, and any combination thereof. In an example, the memory 604 may store local versions of applications being executed by processor 602.

The example computing device 600 may include a communications component 610 that provides for establishing and maintaining communications with one or more other devices utilizing hardware, software, and services as described herein. The communications component 610 may carry communications between components on the computing device 600, as well as between the computing device 600 and external devices, such as devices located across a communications network and/or devices serially or locally connected to the computing device 600. For example, the communications component 610 may include one or more buses, and may further include transmit chain components and receive chain components associated with a transmitter and receiver, respectively, operable for interfacing with external devices.

The example computing device 600 may include a datastore 612, which may be any suitable combination of hardware and/or software, that provides for mass storage of information, databases, and programs employed in connection with implementations described herein. For example, the datastore 612 may be a data repository for the operating system 606 and/or the applications 608.

The example computing device 600 may include a user interface component 614 operable to receive inputs from a user of the computing device 600 and further operable to generate outputs for presentation to the user (e.g., a presentation of a GUI). The user interface component 614 may include one or more input devices, including but not limited to a keyboard, a number pad, a mouse, a touch-sensitive display (e.g., display 616), a digitizer, a navigation key, a function key, a microphone, a voice recognition component, any other mechanism capable of receiving an input from a user, or any combination thereof. Further, the user interface component 614 may include one or more output devices, including but not limited to a display (e.g., display 616), a speaker, a haptic feedback mechanism, a printer, any other mechanism capable of presenting an output to a user, or any combination thereof.

In an implementation, the user interface component 614 may transmit and/or receive messages corresponding to the operation of the operating system 606 and/or the applications 608. In addition, the processor 602 executes the operating system 606 and/or the applications 608, and the memory 604 or the datastore 612 may store them.

Further, one or more of the subcomponents of the a database engine 112, the metadata management module 114, the access control module 116, and the security portal 118 may be implemented in one or more of the processor 602, the applications 608, the operating system 606, and/or the user interface component 614 such that the subcomponents of a database engine 112, the metadata management module 114, the access control module 116, and the security portal 118 are spread out between the components/subcomponents of the computing device 600.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Non-transitory computer-readable media excludes transitory signals. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
    assigning a data tag to an attribute of a plurality of database rows of a database table, the data tag identifying a pre-defined category associated with the attribute;
    generating an association between the data tag and a data usage scenario, the data usage scenario corresponding to a workflow that generates a plurality of requests for data from the database table, the association indicating that the attribute is accessible to a plurality of requests associated with the data usage scenario based on the assigning of the data tag to the attribute;
    associating a user role to the data usage scenario, the user role representing a job function performed by a plurality of user accounts possessing the user role;
    determining, in response to a request of the plurality of requests associated with the data usage scenario, a permission of an account of the plurality of user accounts based on the data usage scenario and the user role associated with the request; and
    providing, in response to the request and based on the permission, the attribute for a database row of the plurality of database rows.

2. The method of claim 1, further comprising:
    receiving, via a web application, a data usage scenario selection and a data identifier corresponding to the attribute; and
    generating the request based on the data usage scenario selection and the data identifier.

3. The method of claim 1, further comprising receiving the request from a client device, the request including at least an account identifier identifying the account and a data identifier corresponding to the attribute.

4. The method of claim 1, wherein the permission corresponds to membership within a security group, and wherein determining the permission of the account further comprises:
    determining that the account is a member of the security group.

5. The method of claim 4, further comprising adding the account to the security group based upon the account possessing the user role.

6. The method of claim 1, wherein the permission is stored as metadata within a database, and further comprising:
    detecting an update to the attribute, the database table, the plurality of user accounts, the data usage scenario, and/or the user role; and
    dynamically updating the metadata based upon the detecting.

7. The method of claim 1, wherein the permission is a first permission, the attribute is a first attribute, and further comprising:
    determining, in response to the request, absence of a second permission based on a security group of the account; and
    denying access to a second attribute of the database row of the plurality of database rows based on the absence of the second permission.

8. A system comprising:
    a memory storing instructions thereon; and
    at least one processor coupled with the memory and configured by the instructions to:
        assign a data tag to an attribute of a plurality of database rows of a database table, the data tag identifying a pre-defined category associated with the attribute;
        generate an association between the data tag and a data usage scenario, the data usage scenario corresponding to a workflow that generates a plurality of requests for data from the database table, the association indicating that the attribute is accessible to a plurality of requests associated with the data usage scenario based on the assigning of the data tag to the attribute;
        associate a user role to the data usage scenario, the user role representing a job function performed by a plurality of user accounts possessing the user role;
        determine, in response to a request of the plurality of requests associated with the data usage scenario, a permission of an account of the plurality of user accounts based on the data usage scenario and the user role associated with the request; and
        provide, in response to the request and based on the permission, the attribute for a database row of the plurality of database rows.

9. The system of claim 8, wherein the at least one processor is further configured by the instructions to:
    receive, via a web application, a data usage scenario selection and a data identifier corresponding to the attribute; and
    generate the request based on the data usage scenario selection and the data identifier.

10. The system of claim 8, wherein the at least one processor is further configured by the instructions to receive the request from a client device, the request including at least an account identifier identifying the account and a data identifier corresponding to the attribute.

11. The system of claim 8, wherein the permission corresponds to membership within a security group, and to determine the permission of the account, the at least one processor is configured by the instructions to determining that the account is a member of the security group.

12. The system of claim 11, wherein the at least one processor is further configured by the instructions to add the account to the security group based upon the account possessing the user role.

13. The system of claim 9, wherein the permission is stored as metadata within a database, and the at least one processor is further configured by the instructions to:
    detect an update to the attribute, the database table, the plurality of user accounts, the data usage scenario, and/or the user role; and
    dynamically update the metadata based upon the detecting.

14. The system of claim 9, wherein permission is a first permission, the attribute is a first attribute, and the at least one processor is further configured by the instructions to:
- determine, in response to the request, absence of a second permission based on a security group of the account; and
- deny access to a second attribute of the database row of the plurality of database rows based on the absence of the second permission.

15. A non-transitory computer-readable device having instructions thereon that, when executed by at least one computing device, cause the at least one computing device to perform operations comprising:
- assigning a data tag to an attribute of a plurality of database rows of a database table, the data tag identifying a pre-defined category associated with the attribute;
- generating an association between the data tag and a data usage scenario, the data usage scenario corresponding to a workflow that generates a plurality of requests for data from the database table, the association indicating that the attribute is accessible to a plurality of requests associated with the data usage scenario based on the assigning of the data tag to the attribute;
- associating a user role to the data usage scenario, the user role representing a job function performed by a plurality of user accounts possessing the user role;
- determining, in response to a request of the plurality of requests associated with the data usage scenario, a permission of an account of the plurality of user accounts based on the data usage scenario and the user role associated with the request; and
- providing, in response to the request and based on the permission, the attribute for a database row of the plurality of database rows.

16. The non-transitory computer-readable device of claim 15, wherein the operations further comprise:
- receiving, via a web application, a data usage scenario selection and a data identifier corresponding to the attribute; and
- generating the request based on the data usage scenario selection and the data identifier.

17. The non-transitory computer-readable device of claim 15, wherein the operations further comprise receiving the request from a client device, the request including at least an account identifier identifying the account and a data identifier corresponding to the attribute.

18. The non-transitory computer-readable device of claim 15, wherein the permission corresponds to membership within a security group, and wherein determining the permission of the account further comprises determining that the account is a member of the security group.

19. The non-transitory computer-readable device of claim 15, wherein the permission is stored as metadata within a database, and the operations further comprise:
- detecting an update to the attribute, the database table, the plurality of user accounts, the data usage scenario, and/or the user role; and
- dynamically updating the metadata based upon the detecting.

20. The non-transitory computer-readable device of claim 15, wherein the permission is a first permission, the attribute is a first attribute, and the operations further comprise:
- determining, in response to the request, absence of a second permission based on a security group of the account; and
- denying access to a second attribute of the database row of the plurality of database rows based on the absence of the second permission.

* * * * *